(12) United States Patent
Sangeneni et al.

(10) Patent No.: US 12,080,015 B2
(45) Date of Patent: Sep. 3, 2024

(54) METHOD(S) AND SYSTEM(S) FOR VEHICULAR CARGO MANAGEMENT

(71) Applicant: Mercedes-Benz Group AG, Stuttgart (DE)

(72) Inventors: Naveen Sangeneni, Fremont, CA (US); Amruta Kulkarni, Santa Clara, CA (US); Kevin Abas, Fremont, CA (US); Reddy Avula Srinivas, Fremont, CA (US); Sreenjoy Chatterjee, San Francisco, CA (US); Andrew Kaneshiro, Los Altos, CA (US); Jyh-Yung Lin, Santa Clara, CA (US); Gagandeep Singh, San Jose, CA (US)

(73) Assignee: Mercedes-Benz Group AG, Stuttgart (DE)

( * ) Notice: Subject to any disclaimer, the term of this patent is extended or adjusted under 35 U.S.C. 154(b) by 709 days.

(21) Appl. No.: 17/271,905

(22) PCT Filed: Jun. 27, 2019

(86) PCT No.: PCT/EP2019/067253
§ 371 (c)(1),
(2) Date: Feb. 26, 2021

(87) PCT Pub. No.: WO2020/043350
PCT Pub. Date: Mar. 5, 2020

(65) Prior Publication Data
US 2021/0319582 A1    Oct. 14, 2021

(30) Foreign Application Priority Data
Aug. 27, 2018   (DE) ...................... 10 2018 006 765.4

(51) Int. Cl.
*G06T 7/62*    (2017.01)
*G06Q 10/08*    (2023.01)
(Continued)

(52) U.S. Cl.
CPC ............... *G06T 7/62* (2017.01); *G06Q 10/08* (2013.01); *G06Q 10/087* (2013.01); *G06T 7/50* (2017.01);
(Continued)

(58) Field of Classification Search
CPC .... G06T 7/62; G06T 7/50; G06T 7/70; G06T 2207/10028; G06T 2207/30268; G06Q 10/087; G06Q 50/28
See application file for complete search history.

(56) References Cited

U.S. PATENT DOCUMENTS

| | | | |
|---|---|---|---|
| 7,746,379 B2 | 6/2010 | Jesson et al. | |
| 2004/0115802 A1* | 6/2004 | Dickson | B63J 99/00 435/326 |

(Continued)

FOREIGN PATENT DOCUMENTS

| | | |
|---|---|---|
| CN | 106152943 A | 11/2016 |
| CN | 106767399 A | 5/2017 |

(Continued)

OTHER PUBLICATIONS

PCT/EP2019/067253, International Search Report dated Aug. 29, 2019 (Three (3) pages).

(Continued)

*Primary Examiner* — Ryan R Yang
(74) *Attorney, Agent, or Firm* — Crowell & Moring LLP (57) ABSTRACT

A method of determining volume of a cargo space of a vehicle in real-time includes generating an initial spatial model of the cargo space using images from a plurality of cameras including cameras for capturing at least one of depth and color, positioned in and around the cargo space, where the images are stitched together into a dense point cloud in real-time, generating an updated spatial model of the cargo space using the images, upon detection of items (Continued)

being loaded or unloaded into the cargo space, where the updated spatial model includes changes to the cargo space, estimating a volume of loaded items in the updated spatial model, and determining a remaining volume of the cargo space based on the estimated volume of the loaded items and a total volume of the cargo space, where the total volume is calculated based on the initial spatial model.

10 Claims, 6 Drawing Sheets

(51) Int. Cl.
*G06Q 10/087* (2023.01)
*G06T 7/50* (2017.01)
*G06T 7/70* (2017.01)

(52) U.S. Cl.
CPC ...... *G06T 7/70* (2017.01); *G06T 2207/10028* (2013.01); *G06T 2207/30268* (2013.01)

(56) References Cited

U.S. PATENT DOCUMENTS

| | | |
|---|---|---|
| 2004/0125217 A1 | 7/2004 | Jesson et al. |
| 2014/0372183 A1 | 12/2014 | Groble et al. |
| 2016/0047646 A1* | 2/2016 | Ochsendorf ......... G01C 21/343 |
| | | 348/148 |
| 2016/0297361 A1* | 10/2016 | Drazan .................. H04N 23/90 |
| 2017/0251143 A1 | 8/2017 | Peruch et al. |
| 2017/0286773 A1 | 10/2017 | Skaff et al. |
| 2018/0068266 A1 | 3/2018 | Kirmani et al. |
| 2019/0098263 A1* | 3/2019 | Seiger ................ G06Q 10/0833 |
| 2019/0114577 A1* | 4/2019 | Kilburn .................. G06Q 50/28 |

FOREIGN PATENT DOCUMENTS

| | | | | |
|---|---|---|---|---|
| CN | 107314741 A | 11/2017 | | |
| DE | 102009047330 B4 * | 2/2013 | ........... G06K 7/0008 |

OTHER PUBLICATIONS

German-language German Office Action issues in German application No. 10 2018 006 765.4 dated Oct. 20, 2020 (Four (4) pages).
Ming Liang et al., "Recurrent Convolutional Neural Network for Object Recognition", 2015 IEEE Conference on Computer Vision and Pattern Recognition (CVPR), IEEE, Jun. 7, 2015, pp. 3367-3375, XP032793786.
Chinese-language Chinese Office Action issued in Chinese Application No. 201980056002.3 dated May 24, 2024 (8 pages).

* cited by examiner

METHOD(S) AND SYSTEM(S) FOR VEHICULAR CARGO MANAGEMENT

TECHNICAL FIELD

The present disclosure generally relates to vehicular cargo management. Particularly, but not exclusively, the disclosure provides techniques for efficient usage of vehicular cargo space and improved cargo delivery.

BACKGROUND OF THE DISCLOSURE

Cargo vehicles form a crucial part of logistics and transportation system(s). The function of these cargo vehicles is to transport cargo/parcels from one location to another. One major problem that arises in cargo delivery is the effective utilization of the space inside the cargo vehicle. In other words, it is often difficult to ensure that the cargo space of a vehicle is fully utilized. This may lead to less than optimal usage of the cargo vehicle. Also, prior knowledge of available cargo space in vehicles would enable a fleet manager to manage cargo across the fleet.

Additionally, at the time of unloading/alighting of cargo/parcels from the cargo vehicle, the delivery executive often takes time and effort to locate the position of a specific parcel inside the vehicle.

SUMMARY OF THE DISCLOSURE

Before the present method, apparatus and hardware embodiments are described, it is to be understood that this invention is not limited to the particular systems and methodologies described, as there can be multiple possible embodiments of the present invention which are not expressly illustrated in the present disclosure. It is also to be understood that the terminology used in the description is for the purpose of describing the particular versions or embodiments only, and is not intended to limit the scope of the present invention which will be limited only by the appended claims.

In an embodiment, the present disclosure describes a method of determining the volume of a cargo space of a vehicle in real-time. In an aspect, the method comprises steps of generating an initial spatial model of the cargo space, such as a 2D, 2.5D or 3D model, using images from a plurality of cameras including at least one camera for capturing depth and color, positioned in and around the cargo space. In an aspect, images from each camera of the plurality of cameras are stitched together into a Dense Point Cloud (DPC) in real-time. The disclosed method further comprises generating an updated spatial model of the cargo space using the images from the plurality of cameras, upon detection of parcels or objects being loaded or unloaded into the cargo space, wherein the updated spatial model includes changes to the cargo space and estimating a volume of loaded parcels in the updated spatial model. Finally, in accordance with the disclosed method, a remaining volume of the cargo space is determined based on said estimated volume of the loaded parcels and a total volume of the cargo space, wherein the total volume is calculated based on the initial spatial model. The usage of the term "parcel" in this description is not meant to limit the scope of the document and should be considered interchangeable with other terms such as: item, object, cargo, package, article, commodity or the like.

In another embodiment, the present disclosure describes a system for continuous volume determination of the cargo space of a vehicle. The disclosed system comprises a model generation unit configured to generate an initial spatial model of the cargo space using images from a plurality of cameras including at least one camera for capturing depth and color, positioned in and around the cargo space. In an aspect, the images from each camera of the plurality of cameras are stitched together into a DPC in real-time. Further, the model generation unit (212) is also configured to generate an updated spatial model of the cargo space using the images from the plurality of cameras, upon detection of parcels being loaded or unloaded into the cargo space. In an aspect, the updated spatial model includes changes to the cargo space. The system as disclosed also comprises a volume estimation unit (214) configured to estimate a volume of loaded parcels in the updated spatial model. Further, the volume estimation unit (214) is configured to determine a remaining volume of the cargo space based on the said estimated volume of the loaded parcels and a total volume of the cargo space, wherein the total volume is calculated based on the initial spatial model.

BRIEF DESCRIPTION OF DRAWINGS

The novel features and characteristics of the disclosure are set forth in the appended claims. The disclosure itself, however, as well as further objectives and advantages thereof, will best be understood by reference to the following detailed description of an illustrative embodiment when read in conjunction with the accompanying drawings. One or more embodiments are now described, by way of example only, with reference to the accompanying drawings wherein like reference numerals represent like elements and in which:

The figures depict embodiments of the disclosure for purposes of illustration only. One skilled in the art will readily recognize from the following description that alternative embodiments of the structures and methods illustrated herein may be employed without departing from the principles of the disclosure described herein.

DETAILED DESCRIPTION

Some embodiments of this invention will now be discussed in detail.

The words "comprising," "having," "containing," and "including," and other forms thereof, are intended to be equivalent in meaning and be open ended in that an item or items following any one of these words is not meant to be an exhaustive listing of such item or items or meant to be limited to only the listed item or items.

It must also be noted that as used herein and in the appended claims, the singular forms "a," "an," and "the" include plural references unless the context clearly dictates otherwise. Although any systems and methods similar or equivalent to those described herein can be used in the practice or testing of embodiments of the present invention, the preferred systems and methods are now described.

The elements illustrated in the figures inter-operate as explained in more detail below. Before setting forth the detailed explanation, however, it may be noted that all of the discussion below, regardless of the particular implementation being described, is exemplary in nature, rather than limiting.

The techniques described herein may be implemented using one or more computer programs executing on (or executable by) a programmable computer including any combination of any number of the following: a processor, a sensor, a storage medium readable and/or writable by the processor (including, for example, volatile and non-volatile memory and/or storage elements), a plurality of input units, a plurality of output devices or networking devices.

Each computer program within the scope of the claims below may be implemented in any programming language, such as assembly language, machine language, a high-level procedural programming language, or an object-oriented programming language. The programming language may, for example, be a compiled or interpreted programming language. Each such computer program may be implemented in a computer program product tangibly embodied in a machine-readable storage device for execution by a computer processor.

Method steps as disclosed by the present disclosure may be performed by one or more computer processors executing a program tangibly embodied on a non-transitory computer-readable medium to perform functions of the invention by operating on input and generating output. Suitable processors include, by way of example, both general and special purpose microprocessors. Generally, the processor receives (reads) instructions and content from a memory (such as a read-only memory and/or a random-access memory) and writes (stores) instructions and content to the memory. Storage devices suitable for tangibly embodying computer program instructions and content include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially designed ASICs (application-specific integrated circuits) or FPGAs (Field-Programmable Gate Arrays).

Figure 1:
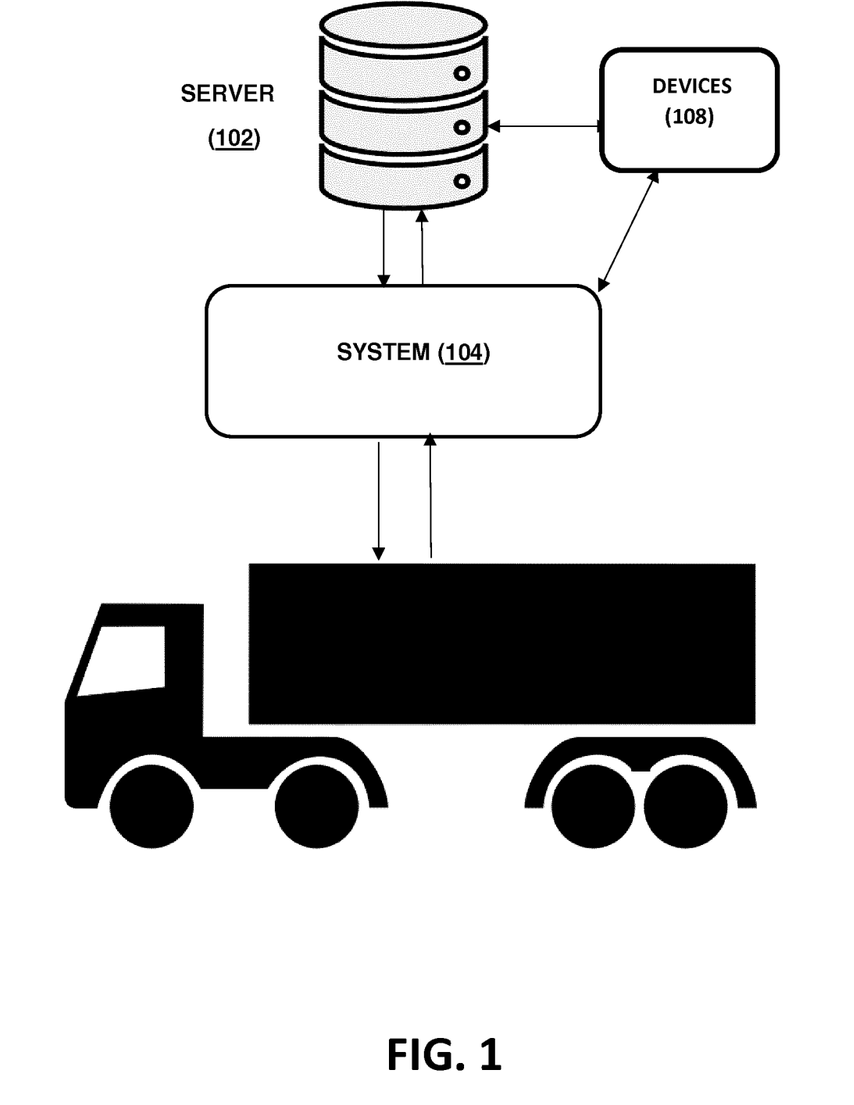
FIG. 1 is a diagram showing an illustrative example of an implementation of the system (104) for a cargo vehicle.

Referring to FIG. 1, a block diagram illustrating a network implementation of the system (104) according to an embodiment of the present disclosure is shown. A server (102), as shown in FIG. 1, may be a server which is linked to store and analyze any information captured by the system (104). For example, the server (102) may be used for storing images/dimensional models, or any other information as will be discussed in the following paragraph. Further, the server (102) may be operable to connect to various devices (108) for transferring any information stored thereon to the devices (108). For example, devices (108) may include devices of a delivery executive. In another example, the devices (108) may be devices used to further analyze and/or process the information transmitted from the server (102). Further, the server (102) may be connected to devices such as mobile base stations, satellite communication networks, etc. to receive and forward any information received by the server (102). For example, a server (102) may receive an emergency broadcast that a certain route is not in operation. Then the server (102) may share this information with the system (104) and the system (104) may use such information at the time of creating a route for navigation. In an embodiment, the server (102) may be a cloud-based server.

It may be noted that the system (104) may be implemented fully or partly on vehicles. In an embodiment, the system (104) may be operatively coupled to the vehicle so as to perform functions as discussed below in the present disclosure. Also, the system (104) and the vehicle may be connected to the server (102) via a network and/or transceiver(s).

In another embodiment, the system (104) may be operable to connect to a user interface such as the infotainment system of the vehicle and/or a mobile device (e.g. mobile phone, PDA's, smart devices) of the delivery executive using the vehicle or the fleet manager.

Figure 2:
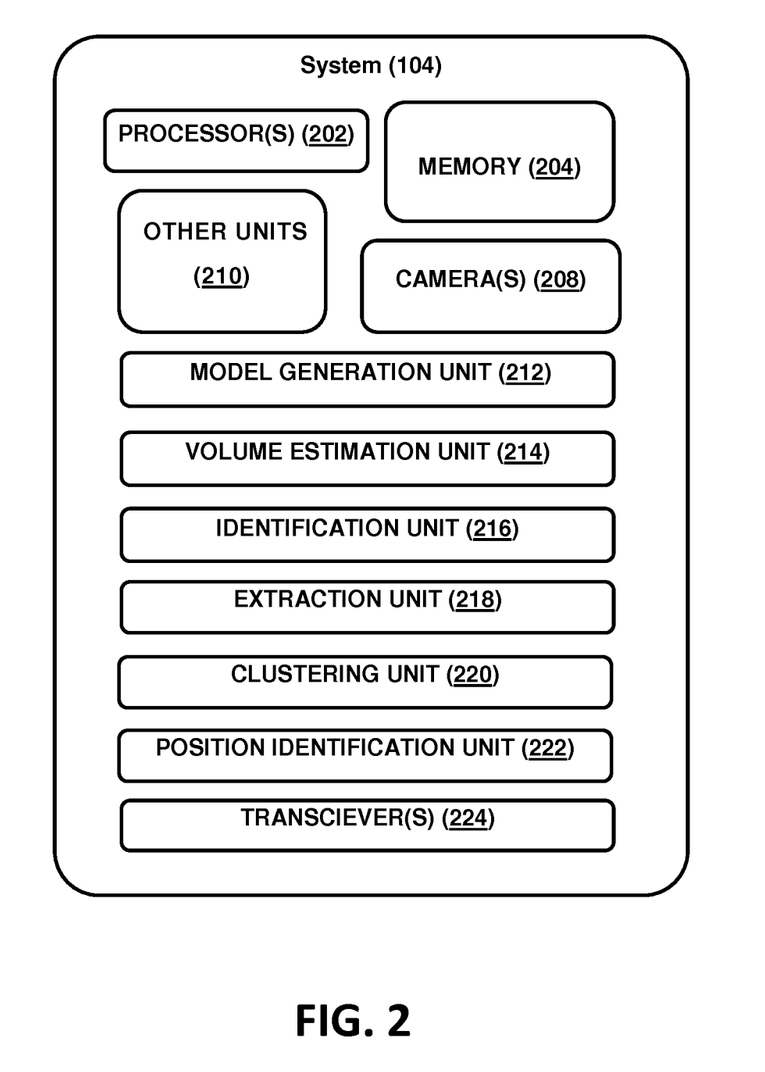
FIG. 2 is a block diagram illustrating various components of the system (104), in accordance with an embodiment of the present disclosure.

Referring now to FIG. 2, the following paragraphs disclose various components of the system (104) for vehicular cargo management. Each of the components of the system (104) may be implemented using one or more hardware processors, software, firmware or any combination thereof.

The disclosed system (104) of FIG. 2 illustrates various components including: processor(s) (202), memory (204), a plurality of camera(s) (208), a model generation unit (212), a volume estimation unit (214), an identification unit (216), an extraction unit (218), a clustering unit (220), a position detection unit (222) and transceiver(s) (224). These components of the system (104) may operate in combination to perform the techniques defined herein. The functionalities of each of the units and other components of the system (104) shall be described in greater detail in the following paragraphs.

Figure 3A:
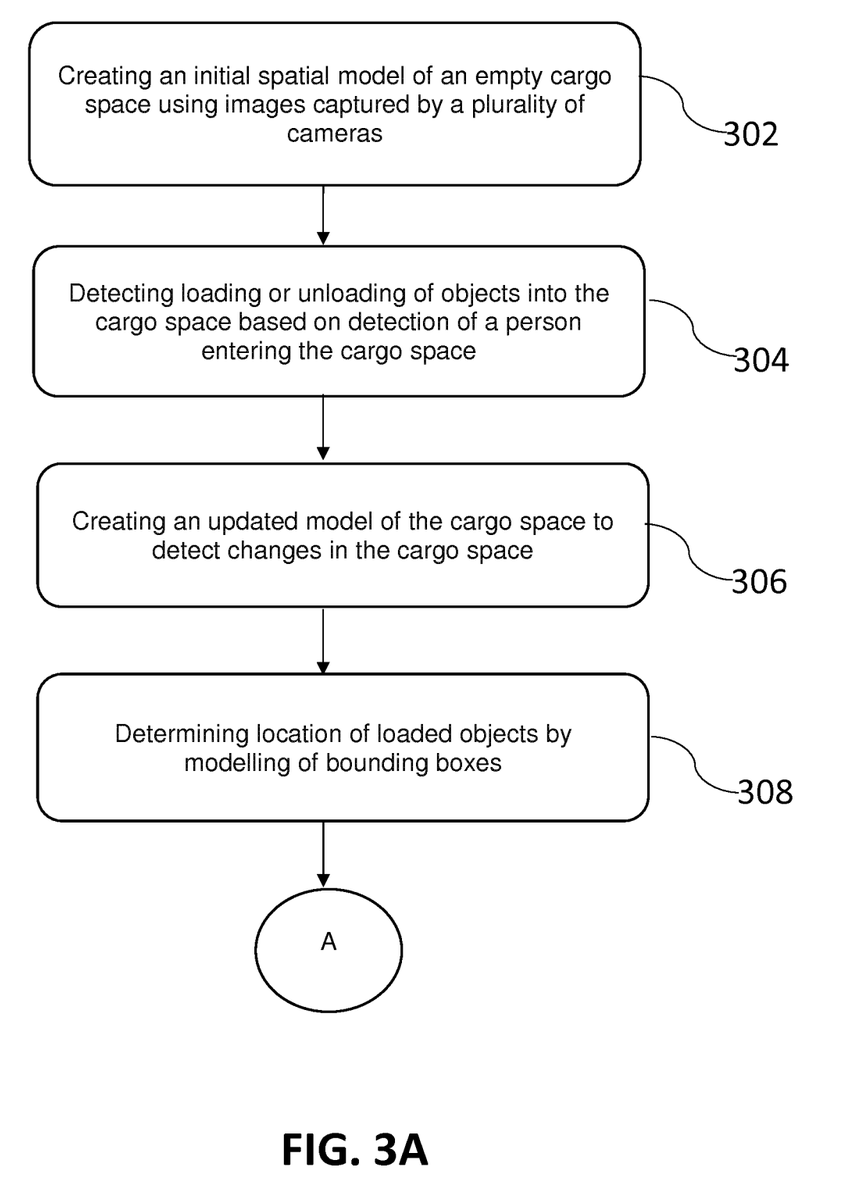
FIGS. 3A and 3B show a flowchart illustrating various techniques of the functioning of the system (104) in accordance with an embodiment of the present disclosure.
Figure 3B:
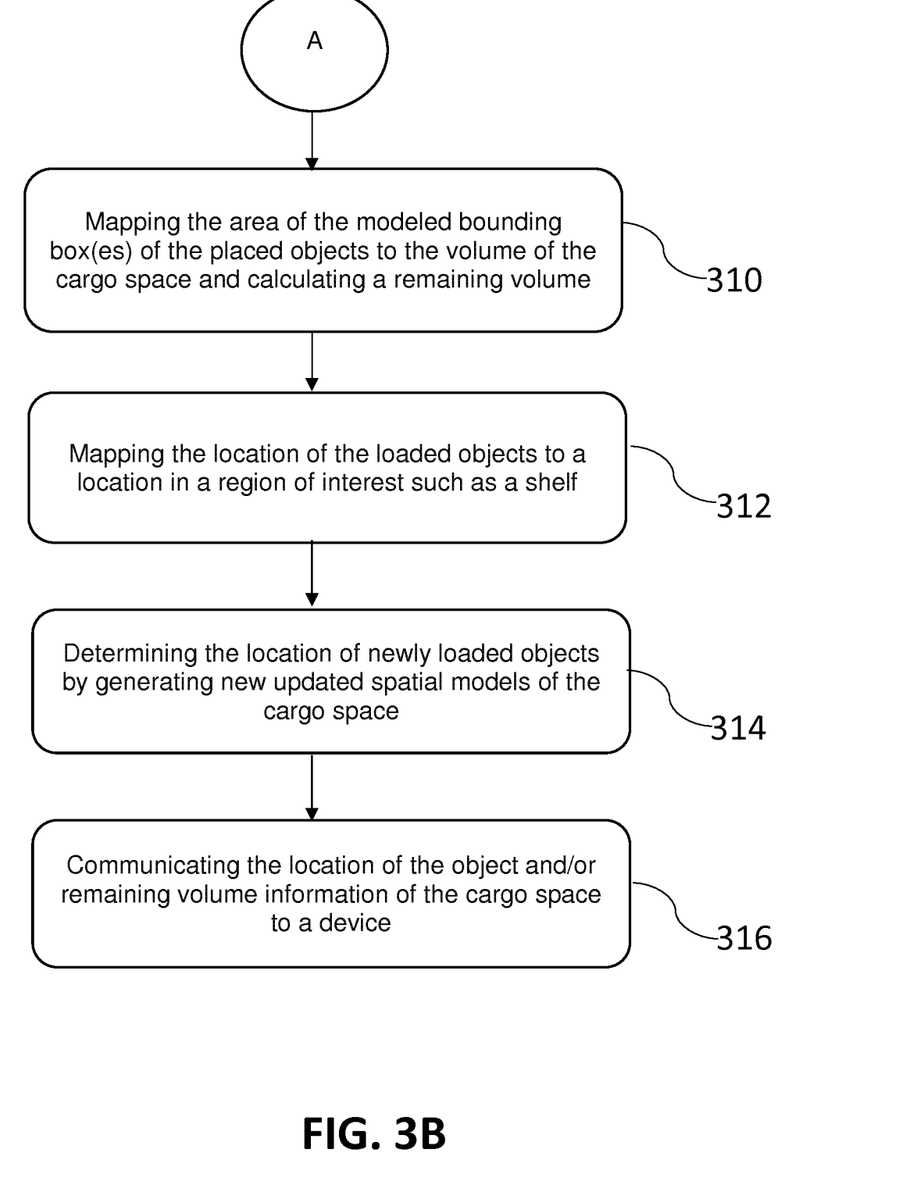
Figure 4:
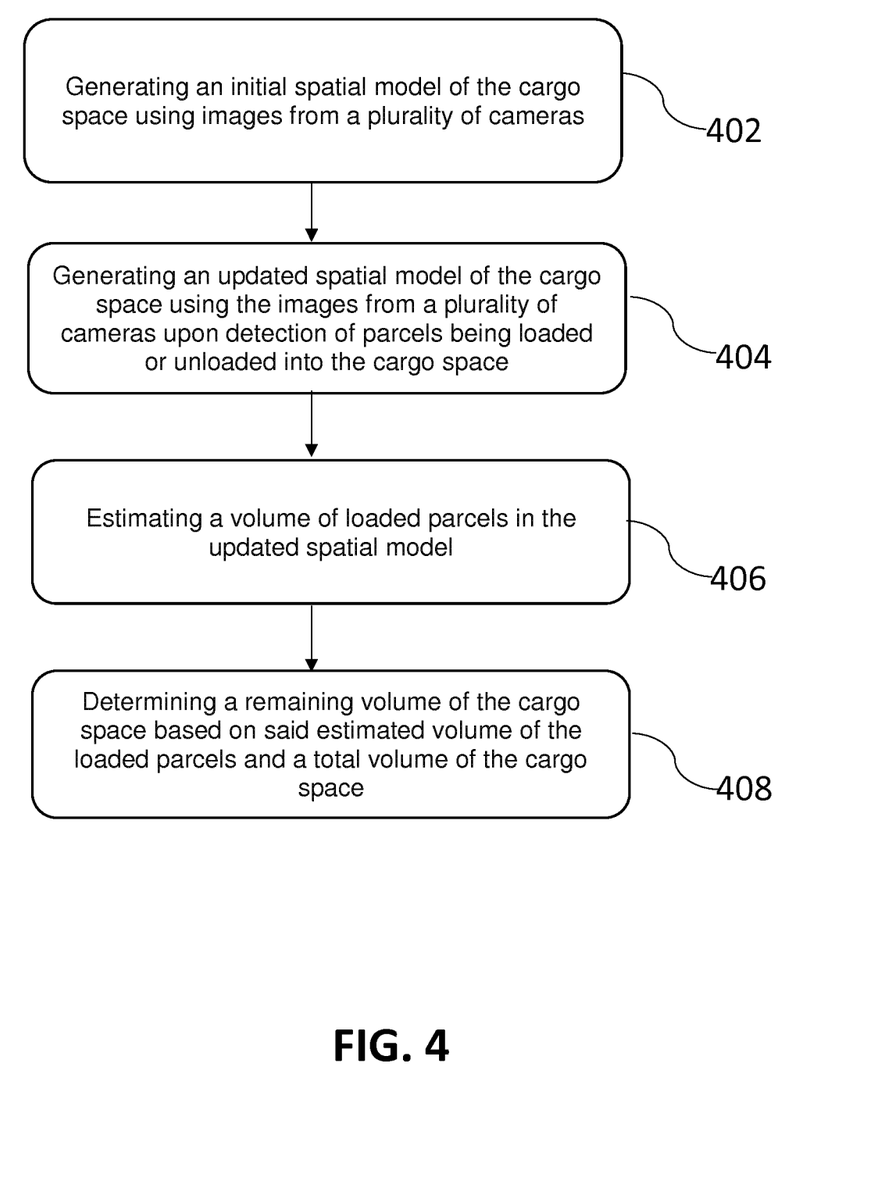
FIG. 4 shows a flowchart illustrating a method of determining the volume of a cargo space of a vehicle in real-time.
Figure 5:
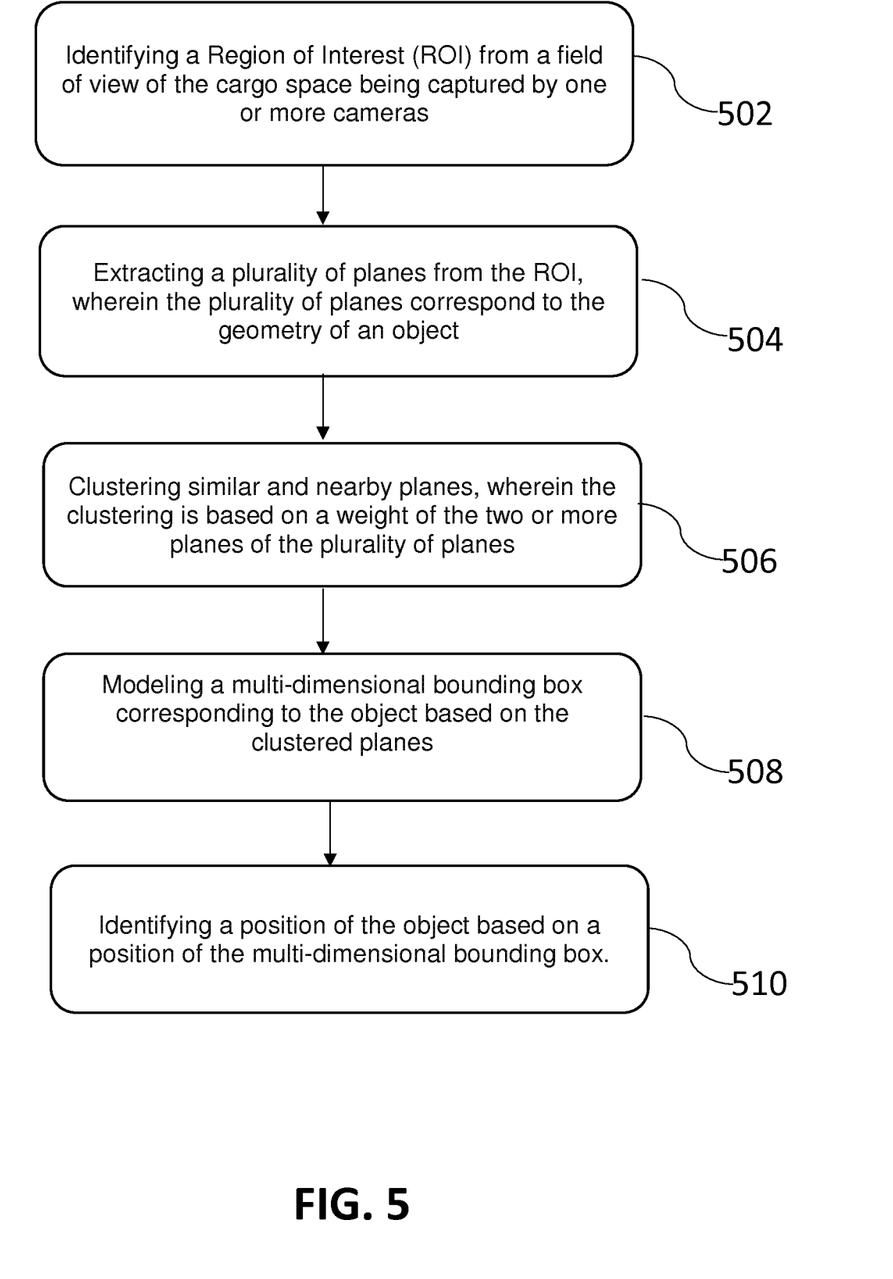
FIG. 5 shows a flowchart illustrating a method for identifying a position of an object in a cargo space.

Referring now to FIGS. 3A and 3B, a flowchart illustrating various steps of the techniques of functionalities of the vehicle cargo management system (104) and the components thereof as illustrated in FIG. 2. Before the steps of the flowchart of FIGS. 3A and 3B are described, it may be understood that certain steps need not be performed in the same order as described in FIGS. 3A and 3B. Also it may be noted that certain processes as disclosed herein may be performed in a mutually exclusive manner, i.e. without any interdependency. For example, the process of volume determination and determination of object position (as illustrated by FIGS. 4 and 5, respectively) may be performed irrespective of each other. Similar processes/techniques which may be performed independently of each other would become clear to a skilled person in the art on reading the following paragraphs that disclose the various cargo management techniques with respect to FIG. 2, FIG. 3A and FIG. 3B.

As per one aspect of the present disclosure, while it is not a requirement for the system to function properly, typically at the beginning of usage the vehicle's cargo space is empty. It is at this time that the model generation unit (212), in operation with the cameras (208), creates the model of the empty cargo space as per the step illustrated at box 302 in FIG. 3A. In one aspect, the cameras (208) include one or more RGB or stereo vision IR depth cameras. In an embodiment, cameras (208) are configured in and around the cargo space and provide a full coverage of the cargo space. The cargo space comprises a contained space that may or may not include shelves or other organizational elements where the cameras (208) are configured such that the field of view covers the full volume under and around the organizational elements or lack thereof.

Further, the configuration of the plurality of cameras (208) is such that the model generation unit (212) can stitch individual images from each of the cameras (208) into a representative spatial model such as a 2D, 2.5D or 3D model. Further, to create the initial spatial model, space may be measured using depth cameras. In an embodiment where Infra-Red (IR) depth cameras are used for measuring depth, the process for depth measurement may be the following. Firstly, an IR projector projects a specified pattern onto the surfaces of the cargo space. The pattern is disrupted based on the surface features of the space and this disruption is read by two IR sensors in the depth camera.

The model generation unit (212) is configured to stitch the data from the camera (208) in the form of a DPC or a mesh in real time. This includes receiving calibration patterns with respect to each of the plurality of cameras to identify relative positions of each of the plurality cameras, identifying intrinsic patterns and extrinsic patterns for the images captured by each of the plurality of cameras; generating a point cloud for each of the images; and merging the point clouds to form the DPC or mesh by overlapping shared portions of the cargo space in each of the images. It may be noted that the shared portions are identified based on the calibration patterns, the intrinsic patterns, and the extrinsic patterns.

Further, in an aspect a global coordinate system (GCS) may be built based on the DPC wherein said GCS is continually updated as camera frames register changes in the cargo space. In certain aspects, an updated spatial model is built based on these changes registered in the cargo space. The conditions and additional details regarding the creation of the updated spatial model are described in the following paragraphs.

Referring again to FIG. 3A block 304, the disclosed techniques of vehicular cargo management include detecting a package drop/load, upon detection of a person entering the vehicle cargo space. In an embodiment, a camera may be mounted above the van's door, pointing to the floor and covering an area that includes several feet on the interior and exterior sides of the van door. Activity is detected using depth thresholding as described below, and the system (104) may determine the type of object being loaded (a parcel or another object such as a human) by using a computer vision deep neural network (DNN) to differentiate between the parcel and other objects.

The process of depth thresholding is described herebelow. At the beginning of a shift when the vehicle's cargo space is empty, the multiple color and depth cameras create an initial spatial model of the cargo space as described in the preceding paragraphs.

The system (104), using the cameras (208), continually samples the cargo space to detect any changes in pixel values between the initial spatial model and the new frames. When changes are detected, an updated spatial model of the cargo space is created as discussed in block 306 FIG. 3A. In one embodiment the system (104) compares the initial spatial model to this updated spatial model between both color and depth image pairs. This comparison is done by subtracting the pixel values of the initial spatial model from the updated spatial model and eliminating any pixels that are the same between both models (i.e. returned a difference of 0).

Also, once movement is detected, the system (104) may be further configured to analyze the detected movement. For example, once movement is detected, the system (104) may then determine motion vectors of a human by comparing pixel values between consecutive frames. These motion vectors aid in predicting the motion of the human.

Movement may be analyzed by combining data from two types of cameras i.e. a depth camera (such as IR depth cameras) and an RGB camera. A depth camera may be placed in the middle of the cargo space on the ceiling, pointing toward the floor. In another aspect, depth may be calculated by using two RGB/monochrome cameras at a known distance from each other and analyzing the two feeds to determine depth similar to what is done with stereo vision.

Further, for analyzing movement, an RGB camera may be located at the top of an entry door with a viewing angle that extends to several feet on either side of the door. The RGB camera detects where movement is happening on a linear scale within its viewing angle, determined by calculating the difference in pixel values between frames. The RGB camera can detect whether this movement is due to a human or another object like a package based on the size of the disturbance (humans are larger and have a different shape than boxes).

In an aspect, the location of this movement is measured for absolute depth values by the depth camera so that the depth camera does not need to calculate depth values within its entire field of view. The direction of movement is then determined by comparing the sequential change in pixels on a linear scale extending away from the camera in both directions. If movement is detected outside the van in one location, followed in sequence by movement detected closer to the camera/origin of the scale, the system knows the object in question is moving toward the camera/into the cargo space.

The combination of these three sensors relays to the system exactly where movement is happening. At the same time, depth cameras pointed at the shelves enable the system (104) to monitor movement in the shelf zones, and a computer vision DNN classifies objects within those regions either as parcels or non-parcels (eg, a hand).

As illustrated at block 308 of FIG. 3A an identification unit (216) illustrated in FIG. 2 may be configured to determine the location of any object loaded into the cargo space based on modeling a bounding box around the area in which pixel difference is not equal to zero. A detailed description regarding modeling bounding boxes is provided in the following paragraphs along with a detailed description of FIG. 5.

Next, as illustrated in FIG. 3B block 310, a volume estimation unit (214) of the system (104) may map an area of the bounding box within the total volume of the cargo space, where an estimate of the remaining cargo volume may be determined. More details on the method for volume estimation are provided in the following paragraphs with reference to FIG. 4. The estimated remaining volume may then be transferred to a user (e.g. delivery person/executive, fleet manager) using transceivers (224), e.g. device (108).

As illustrated by block 312 shown in FIG. 3B, the area of the bounding box is mapped with a location on a shelf of the cargo space. It may be noted that the identification unit (216) may be used to identify the location of the bounding box and area thereof on a shelf of the cargo space of the vehicle.

Furthermore, as illustrated by block 314, the identification unit (216) may be used for identification of locations of newly loaded objects into the cargo space by generating new updated spatial models of the cargo space each time movement is detected in accordance with the foregoing paragraphs. Also, transceivers (224) may be used to notify a user (e.g. a delivery person) of the position of a parcel by transmitting the location to e.g. devices (108).

In one aspect, the vehicle cargo management techniques of this disclosure may be used to direct couriers to the proper package at the time of delivery/unloading. For example, when delivery personnel get to a customer stop, the system (104) identifies the customer at which they've arrived based on the geolocation of the vehicle. The system (104) may then cross-reference the location with geofences drawn in a predefined radius around each customer delivery location. Alternatively, delivery personnel can select a particular customer from their delivery manifest via their handheld device (108), an in-vehicle console (108), or other application display (108). When a door to the cargo space is opened, the system (104) may identify the package IDs corresponding to the particular customer and look up the last known location of that package in the cargo space.

The delivery personnel may then be directed to this location and in turn, the customer's package(s), by audio and/or visual cues, such as LED lights on shelving, a servo-controlled laser pointer or spotlight, or vocal instructions.

According to an embodiment, the camera (208) may use a barcode on the parcels to identify a specific parcel inside the cargo space. As is known in the art, barcodes applied on the parcels can be decoded to retrieve various information regarding the parcels, such as the origin of the parcel, a destination location for the parcel and the like. In certain embodiments, this information may be used in combination with the geographical location of the vehicle to share the location of the parcel with delivery personnel. In certain examples, this barcode information coupled with the location of bounding boxes may aid in accurately identifying the position of the object at the time of unloading.

The use of a barcode as discussed above comprises a step of capturing still frames at a high frame rate (for example about 21 frames per second) to ensure minimal image blur at the time of capturing the barcode. This would lead to the accurate capture of a barcode image and aid in accurate decoding of the barcode thereby improving efficiency. In an embodiment, the camera (208) may capture multiple frames of the event and send them to a DNN model to train the model in accurately identifying the barcode images. This DNN assists in further improving the quality of captured barcode images by providing assistance in identifying barcodes in the images.

Decoding of the barcode from images may comprise image frame selection, deblurring and label extraction from such selected and deblurred frames which are explained in the following paragraphs.

Frame selection and deblurring as disclosed herein comprises analyzing multiple image frames for blur and using the frames with the least amount of blur for analysis.

Firstly, as a general rule, it is known that in-focus images (sharp images) tend to contain a large number of high-frequency components while blurry images do not. The system (104) may be configured to differentiate between sharp images and blurry ones by quantifying the number of high-frequency components present in every image. Next, a kernel is applied to each frame which filters out high-frequency components and returns a count of these high-frequency components. A labeled dataset of samples in which the amount of blur present is already known may be put through an algorithm for blur detection. The value of blur calculated by the algorithm may then be compared to the known values. This comparison between the values may be used to construct a calibrated look-up table that may be used to classify images/frames with an unknown amount of blur.

The look-up table may be further strengthened by using a DNN model trained on a large number of samples representing various types and magnitudes of blur. The DNN may be trained on non-blurred samples, with different types of blur applied thereafter. The DNN Model may compare between the two (blurred and non-blurred images) and learn the different point spread function of the various types of blurs. This would enable the DNN model to rectify a novel image/frame and accurately remove the blur.

In addition, motion blur, i.e. blur caused due to the motion of the object at the time of image capture, also needs to the rectified. Any motion blur may be recognized by analyzing the motion vectors of pixels across multiple frames of images and modeling a Point Spread Function (PSF) that represents a pattern of the blur. The calculated PSF can be reapplied to the image in a deconvolution manner to obtain a non-blurred image. Therefore, the PSF acts as a filter that is applied to the image/pixels to reverse the effect of the blur.

The premise of this technology approach is to use cameras (208) to estimate the amount of blur present in an image and correct the quantified blur. A bespoke DNN model may be used to achieve this performance. First, a dataset of images with barcodes, that are in focus and do not contain any blur, is collected. Different types of blur with known PSFs are then added to these images synthetically.

A customized neural network is designed by using an architecture that comprises multiple combinations of convolutional and max-pooling layers. This neural network is then trained to predict the PSF that can be applied to the barcode to rectify the blur. The internal layers of this neural network estimate the amount/number of high-frequency components of the image, model the PSF, and apply that to the original image in a deconvolution manner to rectify blur.

It may be noted that regardless of the cameras leveraged in a system, there will always be some measurable amount of inherent blur present. Aforementioned inherent blur will adversely affect the performance of traditional decoders, which is why this blur also needs to be quantified and rectified via the DNN model.

The process of label extraction begins after an image frame captured by cameras (208) is preprocessed (i.e. the frame is deblurred or goes through a similar procedure). In the label extraction process the edges of all objects, labels, and other features may be detected by using an edge detection algorithm. Next, the image frame may be thresholded and transformed into a binary image. Further, morphological operations may be applied to the image frame to obtain white contours potentially belonging to the object of interest (e.g. a label) against a black background.

Another problem in terms of decoding the barcode is with regards to the orientation of the barcode when the image of the barcode is captured. For instance, at the time of vehicle loading/unloading, the orientation of the parcel may not be such that the correct orientation of the barcode may be captured by the camera (208). In other words, in such scenarios, the barcode may be visible to the camera(s) (208) but the orientation of the barcode may not be correct vis-à-vis the camera(s) (208). Further, in such disoriented barcodes, the blur is also disoriented which causes additional problems in blur removal, so first, the orientation needs to be corrected and then any associated blur may be removed. The following paragraphs provide a technique to solve said problem(s) in accordance with the present disclosure, allowing loading/unloading without such operational difficulties regarding capturing the barcode.

The premise of this disclosed approach is to use data from image sensors/cameras to determine the relative orientation of the label/barcode and re-orient it in an optimal position to allow for a successful barcode decoding. In an aspect, a bespoke DNN model may be utilized to achieve the above. Firstly, a dataset of images containing barcodes rotated at various angles is collected. Each image is annotated manually to get the ground-truth angle of rotation to make the barcode horizontal (this is to teach the neural network to estimate the angle with which a barcode needs to be rotated by, in order to make it horizontal). Also, a customized neural network is designed by using an architecture that comprises multiple combinations of convolutional and max-pooling layers. This neural network is then trained and validated on the annotated dataset for computing the angle of rotation to align a barcode. The internal nodes of this network get activated depending on the features that get extracted at the output of each intermediate layer. The final output of this model is the estimated angle of rotation that needs to be applied to make the barcode horizontal. This unique neural network architecture allows the system to re-orient the barcode at an unlimited scale.

This architecture is designed to operate under mitigating image conditions such as a lack of sharpness/focus, motion blur, underexposure, or ambient noise. This feature may be used with, but is not limited to, a camera with a frame rate of about 30 FPS+.

Further, the present disclosure also provides techniques that may be employed at the time of loading/unloading of parcels to ensure that parcels are located at preassigned positions based on a manifest i.e. loaded into the correct cargo vehicle in a fleet or unloaded at the correct customer stop. At the time of loading/unloading parcels into/out of the cargo space, images captured by the camera (208) may use a unique identifier of the parcel to identify the parcels. The unique identifiers may include the shape/size of the parcel or a barcode placed on the parcel that may be decoded, in accordance with the above description, for identifying any parcel. The system (104) may cross-reference the parcel at the time of loading and unloading to a pre-created manifest of the parcels to ensure that the parcels are loaded into the correct vehicle and the correct parcel is unloaded at the time of unloading of the parcel.

The system (104) may use transceivers (224) for sending an alert to one or more users. For example, an alert may be sent to devices (108) on detection of any error. The alert may be a visual alert, auditory alert, or any combination thereof. The type of error (such as loading of a parcel into the wrong vehicle or unloading of the wrong parcel at a geolocation) may be designated by different types of alerts, for example through a series of different beeps, flashes, or different colors.

In one example, the system could alert the driver that they are attempting to unload another customer's packages or that there are remaining packages for that customer to be unloaded. Couriers could also be alerted via any handheld device, smartwatch, smartphone, or other electronic display on their person or in the vehicle.

As would be understood by those skilled in the art, the techniques of this disclosure would require optimization of any processors (202) and memory (204), (i.e. CPUs, GPUs) to efficiently perform the scanning methodologies described herein. The following paragraphs directly describe the overall scanning pipeline and logic of how a barcode is detected and decoded in substantially less time, as per the embodiments of the present disclosure.

First, an initial data collected from the cameras (208) is processed by a CPU and reformatted in a way that is acceptable to the deep learning GPU model (GPU Model 1). The GPU Model 1 takes about 23 milliseconds to recognize and crop out the barcode, label, QR code, or box using DNN.

Next, once the label is cropped out, the system (104) then proceeds to find the barcode in a second GPU model. These model detections (Model 1 output) are parsed on the CPU and prepared/formatted as an input for the next model (GPU Models 2 and 3) by involving programming methodologies/functions. Using further DNN models, the angle by which the barcode needs to be rotated by is detected (GPU Model 2) and the blur value (GPU Model 3) is also detected.

The outputs of these models are sent to the CPU to actually perform the function of rotating and/or deblurring the image (which takes about 6 ms) or to pass it directly to the decoder for decoding the barcode if rotating and/or deblurring is not needed. A decoder may then be used to interpret the barcode on the CPU, generating an output and comparing it to the manifest, for example by an associated tracking number or customer name and/or address.

If all of these above methods fail to extract a clear barcode, then an optical character recognition (OCR) model may be implemented, which is able to recognize the tracking number in 1-2 seconds. In other words, the OCR is taught to identify various visual codes/numbers for recognizing features like a tracking number, which can then be used to look up the information that would otherwise be provided by the barcode. However, if the barcode is successfully decoded, the frames for OCR are discarded.

Referring now to FIG. 4, a flowchart illustrating a method of determining volume of a cargo space of a vehicle in real-time is shown. The method starts at block 402 where an initial spatial model of the cargo space is generated using images from a plurality of cameras (208). The method of this step may be performed by the model generation unit (212) as illustrated in FIG. 2. In an aspect, the plurality of cameras includes cameras for capturing at least one of depth and color, positioned in and around the cargo space. In an aspect, the spatial model is generated using a DPC created by stitching the images captured by the plurality of cameras (208). The initial spatial model may be generated using the techniques which have been discussed in the previous paragraphs in this disclosure.

Further, stitching of images may comprise receiving calibration patterns with respect to each of the plurality of cameras (218) to identify relative positions of each of the plurality cameras (218), identifying intrinsic patterns and extrinsic patterns for the images captured by each of the plurality of cameras generating a point cloud for each of the images, and merging the point clouds to form the DPC by overlapping shared portions of the cargo space in each of the images. In accordance with the present invention, shared portions between images may be identified based on the calibration patterns, the intrinsic patterns, and the extrinsic patterns.

Further as shown in block 404, an updated spatial model is generated using the images from the plurality of cameras, upon detection of parcels being loaded or unloaded into the cargo space. This step of generation of the updated spatial model may be performed by the Model Generation Unit (212) in combination with the plurality of cameras (208). Further, the detection of parcels being loaded and/or unloaded from the cargo space may be based on detection of a movement as disclosed in the foregoing paragraphs of this disclosure.

Next, at block 406, volume of the loaded parcels in the updated spatial model are estimated using the volume estimation unit (214). In one embodiment where parcels are loaded on shelves inside the cargo space the volume may be estimated based on a volume between outer edges of a bounding box corresponding to each loaded parcel and a depth of a shelf accommodating the corresponding loaded parcel in the cargo space wherein depth of each shelf is calculated based on the initial spatial model.

Further, at block 408, a remaining volume of the cargo space is calculated based on the estimated volume of the loaded parcels and a total volume of the cargo space, wherein the total volume is calculated based on the initial spatial model. In one aspect the remaining volume may be calculated by subtracting the total volume of the loaded parcels from the volume of the total volume of the cargo space. The determination may be performed using similar techniques as discussed in this disclosure.

Information indicating the remaining volume may be transmitted, using a transceiver (224), to a device (108) or to a server (102). The remaining volume information may be sent to the device (108) of delivery personnel or to the fleet manager. This remaining volume information may be in the form of an absolute number, a percentage of the total van volume, or an estimate of the number of packages the cargo space can still accommodate. The estimation of the number of packages may be done by calculating the average package volume, either of this specific vehicle, of a specific subclass of the total fleet, or of the total fleet.

Referring now to FIG. 5, a flowchart illustrating a method for identifying a position of an object in a cargo space is shown. At block 502, a Region of Interest (ROI) from a field of view of the cargo space being captured by one or more cameras (218) is identified. This step may be performed by the identification unit (216) illustrated in FIG. 2. In one aspect the one or more cameras capture at least one of depth and colour of the field of view. The camera may comprise an RGB camera, stereo camera, infrared (IR) depth camera and the like. The region of interest may be a location with a high probability of locating an object. For example, in a cargo space where the objects are loaded on shelves, the area of the shelves may be determined as the ROI whereas the full cargo space will be in the field of view. The ROI may be identified using the technique of subtracting space as described in the previous paragraphs with regards to detection of movement and subtraction of pixels from the model.

Further as illustrated at block 504, a plurality of planes are extracted from the ROI wherein the plurality of planes correspond to the geometry of the object to be identified. The extracted planes may be labeled and tagged for training a DNN. For example, the DNN may be trained to identify parcels from other objects in the cargo space based on the tagged data. Also, extraction of layers may be based upon depth information provided by a depth camera (such as an IR camera). In this regard, it may be pertinent to note that the objects are considered as comprising parcels and non-parcels. To identify non-parcels from the parcels a model can be developed that includes the most common object types to be found in different vehicles (screws, hammers, chainsaws, etc.).

In order to build a DNN model for said identification, first a large, diverse dataset that addresses all scenarios like illumination, skew, rotation, orientation, material, and other features may be collected. Next, a Recurring Convolutional Neural Network (RCNN) model may be used to build application-specific layers of the neural network that are customized to accurately identify unique features that allow the system to uniquely identify each object. This ensures a higher level of accuracy compared to conventional image processing techniques.

All objects coming into the van would be recognized by the DNN described above, and the system could provide drivers and fleet managers a real-time digital inventory of their vehicle. If a single driver uses one particular vehicle, this DNN may learn the specific objects stored by that driver in the vehicle cargo area, so as to differentiate between their inventory and the inventory of their colleagues.

Now at block 506, similar and nearby planes are clustered together using the clustering unit (220). The clustering is based on a weight of the two or more planes of the plurality of planes wherein the weight is assigned based on a property of orthogonality and dimensions of two or more planes of the plurality of planes. The weight assigned based on the property of orthogonality is more than the weight assigned based on the property of dimensions of the two or more planes of the plurality of planes. In other words, the probability of two planes corresponding to an object is considered higher when the planes are determined to be orthogonally located.

At blocks 508 and 510, the method goes on to model a multi-dimensional bounding box that could be 3D corresponding to the clustered planes and identifying the position of the object in the cargo space based on the position of the multi-dimensional bounding box within the DPC or global coordinate system. The method of these blocks may be performed by the model generation unit (212) and the position identification unit (222), respectively. This position may then be stored on a server or transmitted to devices (108) using the transceiver (224).

The method as disclosed in FIG. 4 and FIG. 5 may be performed iteratively. Alternatively, the method of FIG. 5 may be performed after a predefined number of frames.

Further on repetition of the method FIG. 5, it may be determined that the location of an object has changed from the position identified during the previous iteration of the method. For example, the system (104) will be able to identify what movement occurred between frames by identifying a similar bounding box at a different position from the previous iteration of the method and thereby determine a change in position. The system (104) may then update this information into the server (102) or transmit it to any device (108) using a transceiver (224). Also, in case the system (104) detects a new object based on presence of an additional bounding box in the cargo space as compared to the previous iteration of the method of FIG. 5, the system (104) may use the transceivers (224) to update the same to the server (102) or transmit this information the device (108).

It may be clear to those skilled in the art that the presently disclosed system and method may be used either independently or in combination with existing technologies being implemented for vehicular cargo space management.

While various aspects and embodiments have been disclosed herein, other aspects and embodiments will be apparent to those skilled in the art. It may be pertinent to note that various aspects and embodiments disclosed herein are for purposes of illustration and are not intended to be limiting, with the true scope being indicated by the following claims.

We claim:

1. A method of determining volume of a cargo space of a vehicle in real-time, comprising the steps of:
generating an initial spatial model of the cargo space using images from a plurality of cameras including cameras for capturing at least one of depth and color, positioned in and around the cargo space, wherein the images from each camera of the plurality of cameras are stitched together into a dense point cloud (DPC) in real-time;
generating an updated spatial model of the cargo space using the images from the plurality of cameras, upon detection of items being loaded or unloaded into the cargo space, wherein the updated spatial model includes changes to the cargo space;

estimating a volume of loaded items in the updated spatial model; and determining a remaining volume of the cargo space based on the estimated volume of the loaded items and a total volume of the cargo space, wherein the total volume is calculated based on the initial spatial model.

2. The method as claimed in claim 1, wherein the items are loaded on shelves inside the cargo space.

3. The method as claimed in claim 2, wherein the volume of the loaded items is estimated based on a volume between outer edges of a bounding box corresponding to each loaded item and a depth of a shelf accommodating the corresponding loaded item in the cargo space.

4. The method as claimed in claim 3, wherein depth of each shelf is calculated based on the initial spatial model.

5. The method as claimed in claim 1 further comprising transmitting information indicating the remaining volume of the cargo space to at least one device.

6. The method as claimed in claim 5, wherein the information indicating the remaining volume is transmitted as at least one of an absolute number, a percentage of the total volume of the cargo space, and an estimated number of items which can be loaded into the remaining volume.

7. The method as claimed in claim 1, wherein the stitching of images comprises:

receiving calibration patterns with respect to each of the plurality of cameras to identify relative positions of each of the plurality of cameras;

identifying the calibration patterns for the images captured by each of the plurality of cameras;

generating a point cloud for each of the images; and merging the point clouds to form the DPC by overlapping shared portions of the cargo space in each of the images, wherein shared portions are identified based on the calibration patterns, the intrinsic patterns and the extrinsic patterns.

8. A system for continuous volume determination of the cargo space of a vehicle, comprising:

a model generation unit configured to generate an initial spatial model of the cargo space using images from a plurality of cameras including cameras for capturing at least one of depth and color, positioned in and around the cargo space, wherein the images from each camera of the plurality of cameras are stitched together into a dense point cloud in real-time;

the model generation unit is further configured to generate an updated spatial model of the cargo space using the images from the plurality of cameras, upon detection of items being loaded or unloaded into the cargo space, wherein the updated spatial model includes changes to the cargo space;

a volume estimation unit configured to estimate a volume of loaded items in the updated spatial model; and the volume estimation unit is further configured to determine a remaining volume of the cargo space based on the estimated volume of the loaded items and a total volume of the cargo space, wherein the total volume is calculated based on the initial spatial model.

9. The system as claimed in claim 8, wherein the items are loaded on shelves inside the cargo space and wherein the volume estimation unit estimates the volume of the loaded items based on a volume between outer edges of a bounding box corresponding to each loaded item and a depth of a shelf accommodating the corresponding loaded item in the cargo space.

10. The system as claimed in claim 9, wherein the volume estimation unit is further configured to calculate the depth of each shelf based on the initial spatial model.

* * * * *